United States Patent [19]

Hagiwara

[11] Patent Number: 4,626,785
[45] Date of Patent: Dec. 2, 1986

[54] FOCUSED VERY HIGH FREQUENCY INDUCTION LOGGING

[75] Inventor: Teruhiko Hagiwara, Houston, Tex.

[73] Assignee: Shell Oil Company, Houston, Tex.

[21] Appl. No.: 583,541

[22] Filed: Feb. 24, 1984

[51] Int. Cl.⁴ .............................................. G01V 3/28
[52] U.S. Cl. .................................... 324/339; 324/341
[58] Field of Search ................................ 324/338–343

[56] References Cited

U.S. PATENT DOCUMENTS

| 2,264,318 | 12/1941 | Lee | 324/339 |
| 3,305,771 | 2/1967 | Arps | 324/342 |
| 3,539,911 | 11/1970 | Youmans et al. | 324/343 |
| 3,849,721 | 11/1974 | Calvert | 324/338 |
| 4,107,597 | 8/1978 | Meador et al. | 324/341 |
| 4,107,598 | 8/1978 | Meador et al. | 324/341 |
| 4,278,941 | 7/1981 | Freedman | 324/339 X |
| 4,494,071 | 1/1985 | Fertl | 324/338 |

Primary Examiner—Gerard R. Strecker

[57] ABSTRACT

An improved very high frequency induction log is obtained using a tool having a focused transmitter source. The tool utilizes a second transmitter placed on the opposite side of the receivers from the first transmitter, the second transmitter being supplied with current to produce an opposite antenna current direction to the first transducer. The combination of the two transmitters serves to focus the current flow and increase the depth of investigation.

7 Claims, 5 Drawing Figures (INVENTION)

(INVENTION)

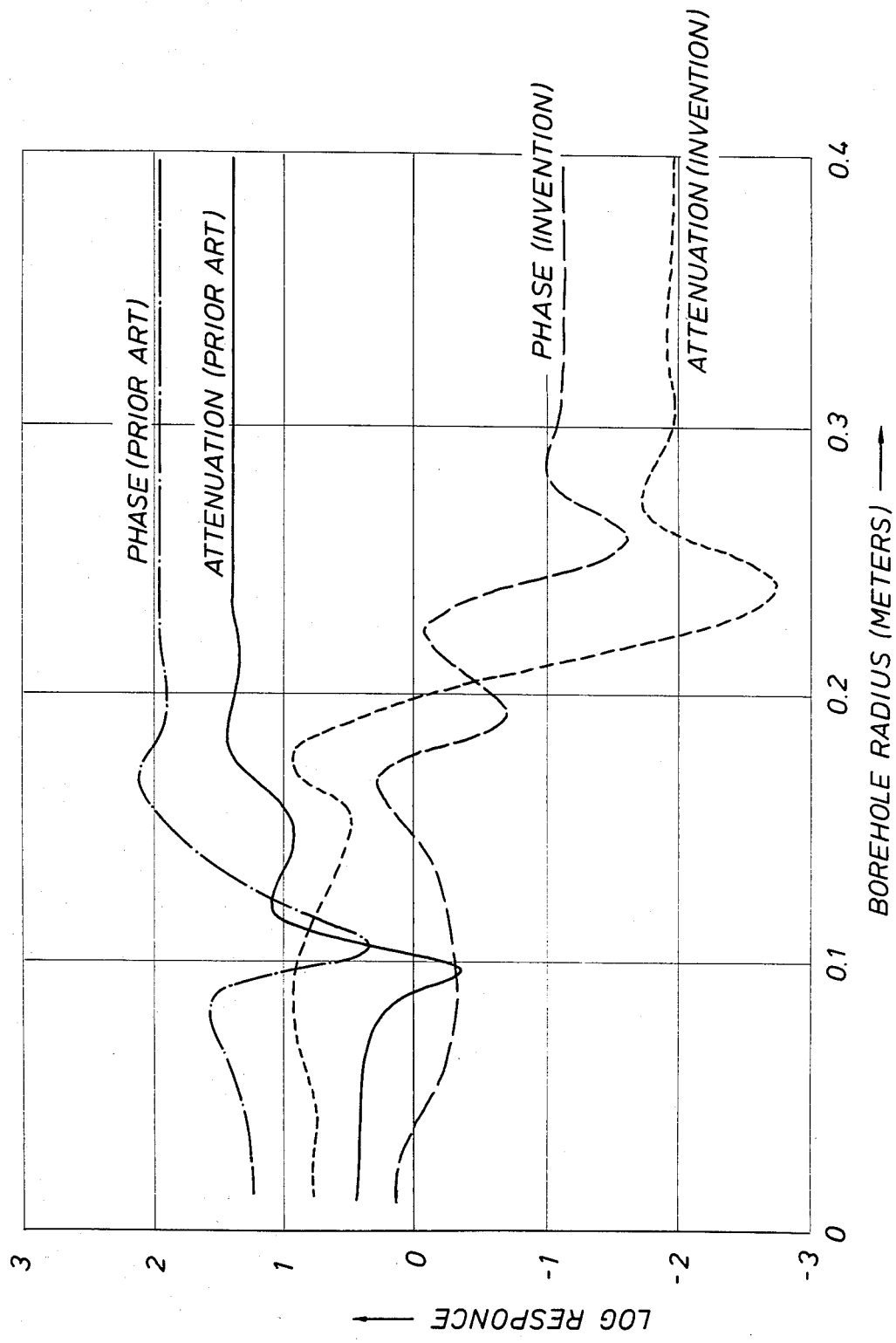

FOCUSED VERY HIGH FREQUENCY INDUCTION LOGGING

BACKGROUND OF THE INVENTION

The present invention relates to high frequency induction logging for determining the resistivity and dielectic constant of the earth. In U.S. Pat. No. 4,278,941 there is described a method and apparatus for logging rock formations that surround a borehole to determine both the resistivity and dielectric constant of the formation. In particular, the patent describes an induction logging tool having a transmitter and two receiver coils and operating in a radio frequency range of 20 to 60 megahertz. The method comprises utilizing both the in-phase and out-of-phase or quadrature voltage components measured at each receiver with respect to the phase of the transmitter current. The in-phase and out-of-phase voltages are used to compute the phase shift and voltage attenuation between the two receivers. Since the phase shift and voltage attenuation are relatively insensitive to borehole diameter and drilling mud resistivity, simple nomograms can be used to determine both the resistivity and dielectric constant of the formation. As an alternative, the formation resistivity and the dielectric constant can be computed using a properly programmed computer. The patent also describes a means using four receivers by which one can compensate for the mud invasion of the formation. It is preferable that the signals detected at the receivers be digitized before transmitting them to the surface to preserve their phase and amplitude. As is well known, the phase and amplitude of analog signals are considerably modified or distorted if they are transmitted over conventional well logging cables. While the method described in the patent provides superior resistivity and dielectric constant information using high frequency induction logging tools, its vertical resolution can be greatly improved if the high frequency induction logging operates at much higher frequency range of 100–500 MHz or higher. However, at such very high frequency, the depth of investigation of the formation is severely limited. It can be shown that the apparatus described in the patent, if it operates at 300 MHz, sees the formation only in those cases where the radius of the borehole is less than 6 centimeters. In fact, when the borehole is 16 centimeters or greater in radius, the tool sees only the mud resistivity. Since the tool must be run in an uncased borehole there are many instances where the borehole radius will exceed 8 centimeters. In fact, except in the case of very deep wells the uncased borehole radius will almost always be greater than 6 centimeters. Thus, the usefulness of the tool described in the prior patent is severely limited in a large majority of the actual wells that are drilled, if it operates at very high frequency to gain high vertical resolution.

SUMMARY OF THE INVENTION

The present application provides a solution to the above problems of propagation of the induced current into the formation by utilizing a focusing transmitter. In particular, the invention utilizes a focusing transmitter which is positioned on the opposite side of the two receivers from the first transmitter. The focusing transmitter is supplied with current to produce an antenna current flow opposite to that produced by the first transmitter. Further, it is desirable that the two receivers be placed closer to one of the two transmitters and not located at the geometric center between the two.

When the above system is used it can be shown that the penetration or propagation of the induced current flow in the formation is approximately double that achieved using a single transmitter. A further advantage of the two transmitter tool results from the fact that it is less sensitive to drilling mud and thus both the phase and attenuation of the signal are representive of and responsive to the formation.

The present invention utilizes the same method for determining the resistivity and dielectric constant of the formation as described in the patent. In particular, the invention utilizes both the in-phase and out-of-phase or quadrature voltages that are measured at each receiver with respect to the phase of the induced current. While the current flow in each of the transmitter coils is opposite or opposed, the phase is maintained the same and thus there is no ambiguity in determining the phase of the signals at the receivers. It can be shown that in the present invention the dielectric constant is responsive to both the attenuation and phase difference and thus both quantities must be determined. In contrast, in the prior patent, with very high frequency, the dielectric constant was, over a large range, substantially responsive to only the phase difference. Thus, while conventional nomograms can be constructed for readily determining the dielectric constant, both amplitude and phase difference must be determined.

BRIEF DESCRIPTION OF THE DRAWINGS

The present invention will be more easily understood from the following detailed description when taken in conjunction with the attached drawings in which:

FIG. 4 shows the response of a tool in relation to the borehole diameter for the prior art and the present invention.

DESCRIPTION OF THE PREFERRED EMBODIMENT

Figures 1A, 1B:
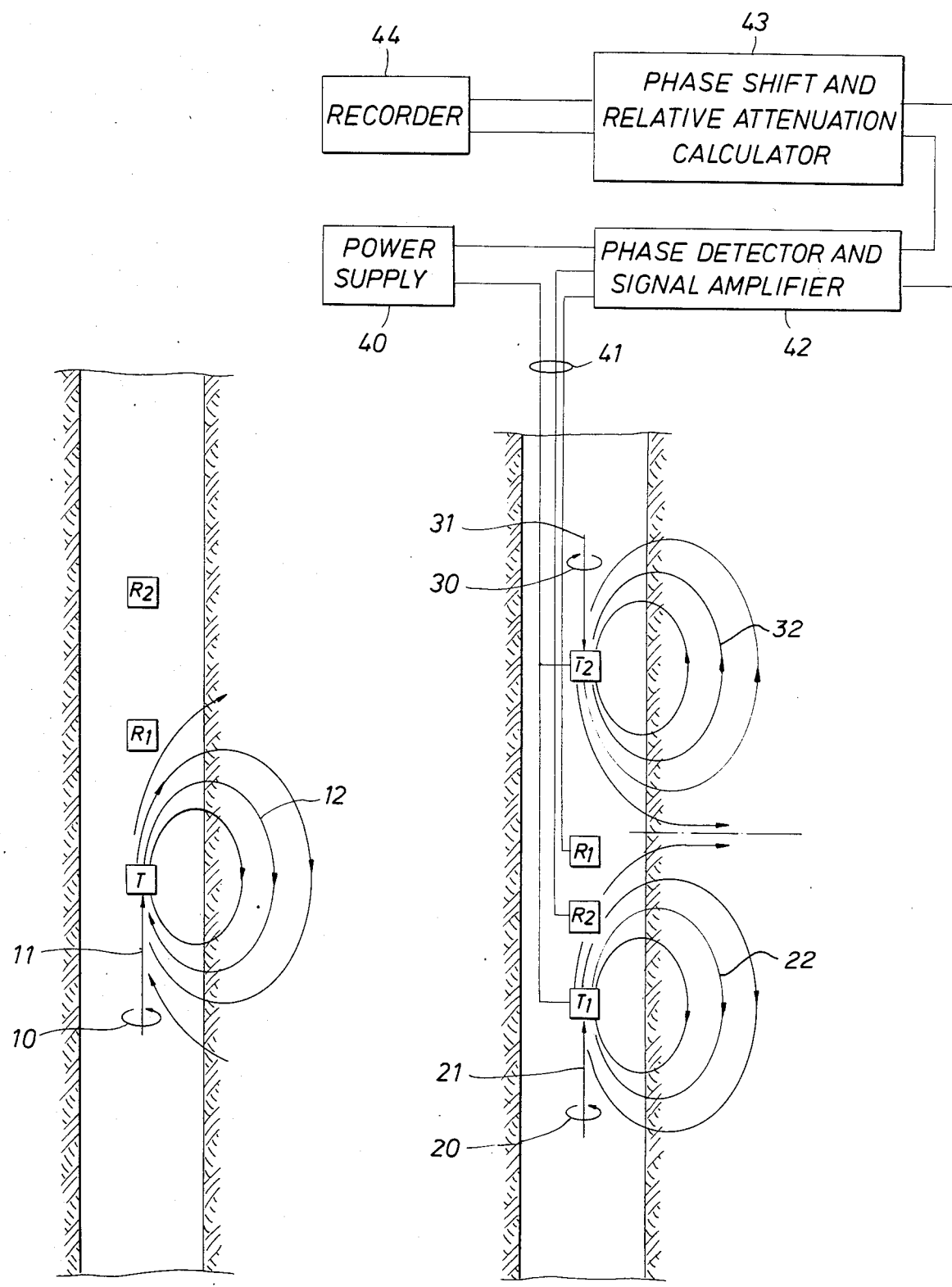
FIGS. 1A and 1B are schematic representations of the prior art and the present invention.

Referring to FIG. 1, there is shown in FIG. 1A a representation of a high frequency induction logging tool of the prior patent. In particular, there is shown a transmitter T and two receivers $R_1$ and $R_2$ spaced above the transmitter. The transmitter coil is energized with a current flowing in the direction of the arrow 10 which produces a field in the direction 11 along the axis of the coil. This current flow then produces a symmetrical field in the formation as shown by the force lines 12. As seen in the Figure, the radiated field is uniform about the transmitter and projects it substantially equal distances above and below the transmitter.

Referring to FIG. 1B there is shown a very high frequency induction logger of the present invention incorporating two transmitters, $T_1$ and $T_2$ which are positioned below and above the two receivers $R_1$ and $R_2$ respectively. The transmitter $T_1$ is energized with a current flow shown by the arrow 20 that produces a field along the axis shown by the arrow 21. This results in a field being radiated throughout the formation as illustrated by the force lines 22. Similarly, the transmitter $T_2$ is energized from a current source having the opposite polarity for producing a field along the axis having a direction illustrated by the arrow 31 that is opposite to the field of transmitter $T_1$ and results in radiation throughout the field along the force lines 32. As is seen in the drawing, the interaction of the opposing force lines of the fields 22 and 32 tend to repel each other, thus flattening the upper portion of the field produced by the transmitter $T_1$ and the flattening of the lower portion of the field produced by the transmitter $T_2$. The effect of this flattening of the fields results in a deeper penetration of the formation by the induced electrical field in the area where the two fields interact.

As shown in FIG. 1B, the transmitters $T_1$ and $T_2$ are energized by a power supply 40 located on the surface of the earth. The power supply 40 generates an alternating current in the frequency range of 300 MHz. This alternating current is fed into the transmitters by means of an insulated conducting cable which is part of the armored cable 41 which is used to raise and lower the logging system. The receiver coils $R_1$ and $R_2$ are connected by an insulated conducting cable which forms part of the armored cable 41, to a phase sensitive detector and amplifier 42. The phase sensitive detector and amplifier 42 is connected by means of the insulated conducting cable to the power supply 40. This permits the transmitter current to be used as a phase reference for the voltage signals received from the receiver coils. These signals are amplified and both their in-phase and out-of-phase, with respect to the transmitter current, voltage components are determined. The phase sensitive detector and amplifier network 42 can be constructed according to the teachings of U.S. Pat. No. 2,788,483. The outputs of this network 42 are the four voltage components from the two receiver coils. These voltage components are input into a calculator 43 which is connected to the phase sensitive detector and amplifier 42 by means of insulated conducting cables. The calculator 43 is a minicomputer which computes, using the four measured voltage components, values of phase shifts and relative attenuations between adjacent receiver coils by using relationships described earlier. The computer is connected to a conventional recording system driven by a measuring wheel (not shown) which is mechanically coupled to cable 41 through an appropriate linkage (not shown). As a result the phase shifts and attenuations are obtained on a log as functions of wireline depth.

Figure 2:
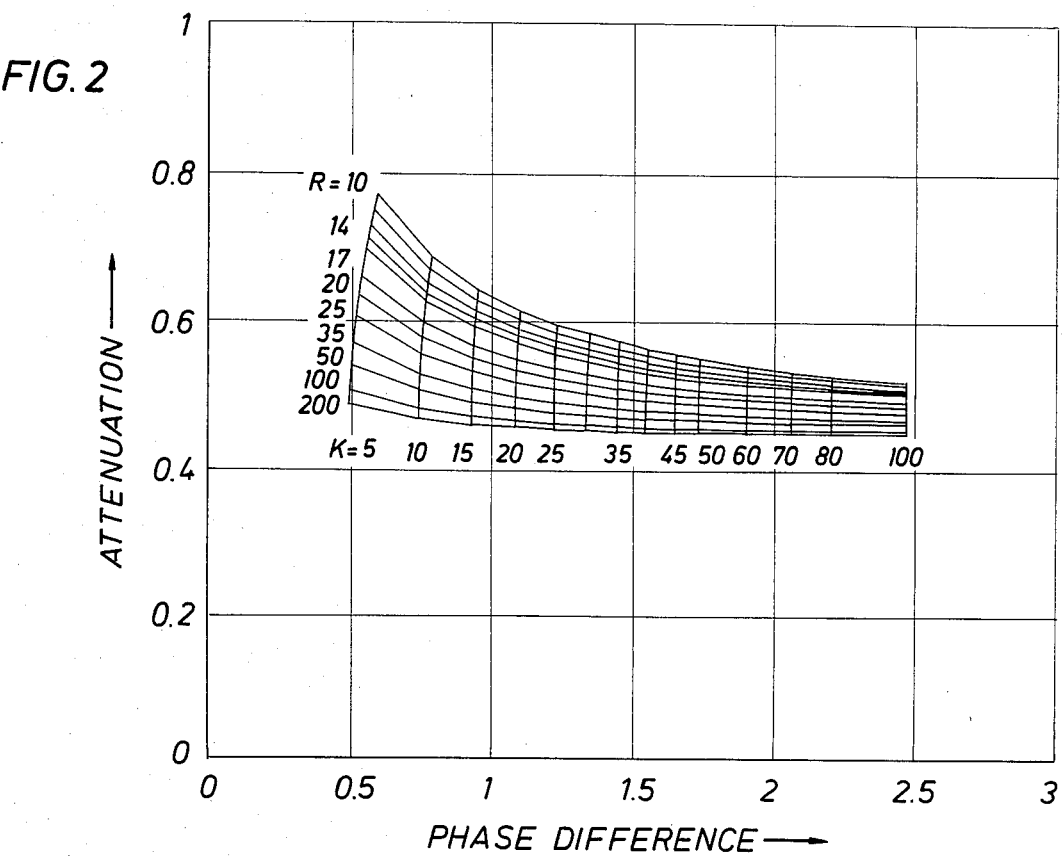
FIG. 2 is a nomogram showing the variation in resistivity and dielectric constant in response to attenuation and phase using the prior art.
Figure 3:
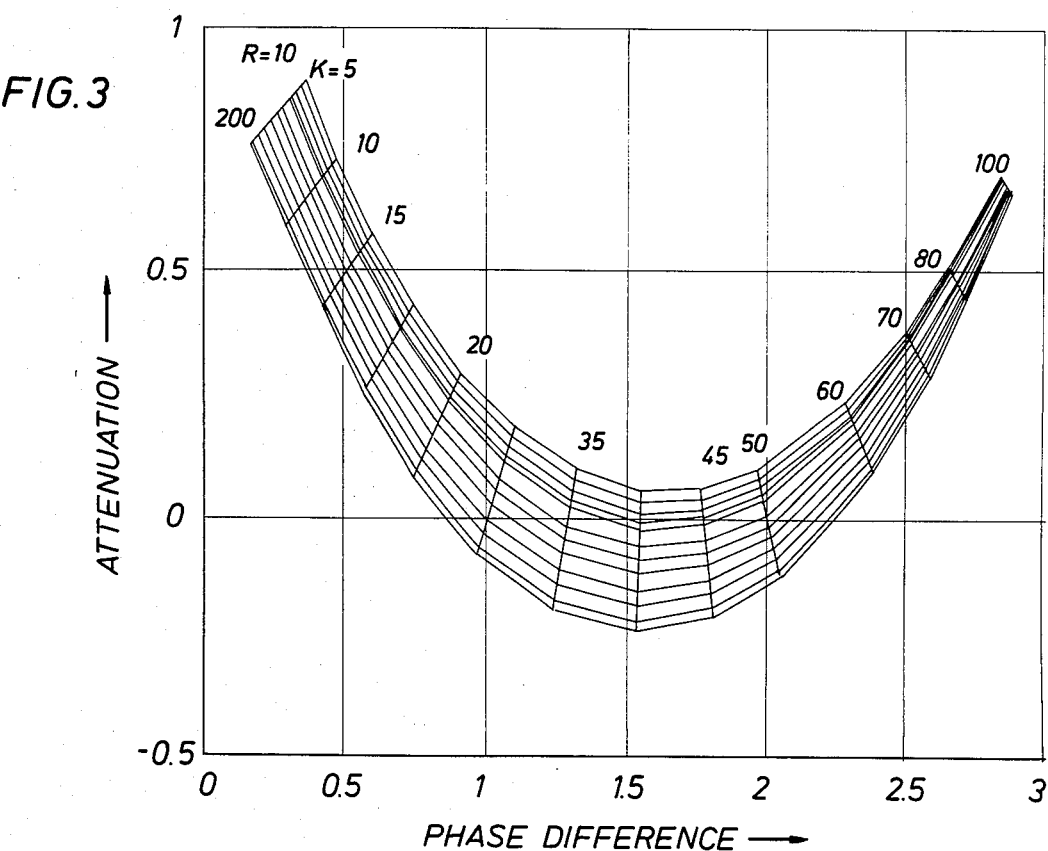
FIG. 3 is a nomogram similar to FIG. 2 but utilizing the present invention.

In addition to providing a deeper penetration of the formation by the induced field, the two fields also reduce the effect of the borehole fluid on the resulting signals at the two receivers. This is more clearly illustrated by the log response as shwon in FIGS. 2 and 3 respectively. There are computed log responses utilizing a homogeneous formation having a dielectric constant that varies between 5 and 100 and a resistivity that varies between 10 and 200 ohm meters. Further, the tool was assumed to have a spacing between transmitter $T_1$ and receiver $R_2$ of 16 centimeters and between transmitter $T_1$ and receiver $R_1$ of 20 centimeters with the spacing between the two transmitters being 48 centimeters. In addition, the receivers were assumed to have a radius of 2 centimeters. The transmitters were energized with an alternating current signal of 300 MHz having a polarity to produce an opposite antenna current direction in the resulting field surrounding the two transmitters. This configuration will produce the log data shown in FIG. 3 while the data shown in FIG. 2 is the same configuration and frequencies except the transmitter 2 is removed from consideration. Referring particularly to FIG. 2, it can be seen that except in the low value areas, the dielectric constant is dependent almost exclusively on the phase difference when using a tool constructed according to the prior patent. Thus, it normally is not necessary to determine the attenuation unless the resistivity of the formation is desired. In contrast, in FIG. 3 it can be seen that the dielectric constant depends not only on the phase difference but upon the attenuation.

Referring to FIG. 4, there is shown the log response for both the prior patent tool and the present invention. In particular, the phase and attenuation measurements for both tools are shown. As is clearly illustrated in the Figure, the prior art tool is only effective in boreholes having a radius of approximately 0.06 meters while the present tool will respond in boreholes having a radius of more than 0.16 meters; the prior patent tool responds only to the borehole fluid while the tool of the present invention does not reach the saturation point until the borehole radius is beyond 0.30 meters. Further, it is obvious that the tool does not respond to the characteristics of the drilling fluid in the borehole but rather almost exclusively to the formation. Only in the area of a phase difference of 1.5 radians is the dielectric constant dependent solely upon the phase difference. Thus, the tool of the present invention will give superior results over those obtained by the prior art.

The logging tool including the signal processing can be constructed and carried out as described in the prior patent or other prior art references well known to those skilled in the art. Likewise, the log data can be processed in the manner described in the patent. For example, the phase shift and relative attenuation are computed from the two measured voltage components determined for the pair of receivers. The receivers $R_1$ and $R_2$ located at $z_1$ and $z_2$ such that $z_2 > z_1$ with respect to transmitter $T_2$. The measured quantities are then the four voltage components $V_{I,1}$, $V_{Q,1}$, $V_{I,2}$ and $V_{Q,2}$. To proceed it is convenient to introduce the complex ratio $$R \equiv R' + iR'' = \frac{V_{I,2} + iV_{Q,2}}{V_{I,1} + iV_{Q,1}} \quad (1)$$

where $$R' = \frac{V_{I,1}V_{I,2} + V_{Q,1}V_{Q,2}}{V_{I,1}^2 + V_{Q,1}^2} \quad (2)$$

and $$R'' = \frac{V_{I,1}V_{Q,2} - V_{Q,1}V_{I,2}}{V_{I,1}^2 + V_{Q,1}^2} \quad (3)$$

It is not difficult to demonstrate that the phase of the complex ratio R is simply the phase shift $\Delta\phi$ of the signals received at the two adjacent receiver coils. This phase shift is therefore given by (in radians)

$$\Delta\phi = \tan^{-1}(R''/R') + F \quad (4)$$

where $R'$ and $R''$ are defined above and the function F is defined by the equation $$F = \pi/2[(1 - \text{sgn } R') + (1 - \text{sgn } R'')(1 + \text{sgn } R')] \quad (5)$$

with the sgn function defined by $$\operatorname{sgn} \chi = \chi/|\chi| \text{ for } \chi \neq 0, \text{ and } 1 \text{ for } \chi = 0 \qquad (6)$$

In equation (4) the inverse tangent is to be understood as a principlevalue and is therefore defined in the range from $-\pi/2$ to $\pi/2$. The function F has been introduced into equation (4) to take proper account of the algebraic signs of the voltage components which results in equation (4) producing continuous phase shifts in the range $0 \leq \Delta\phi \leq 2\pi$. We have thus far shown that the phase shift between two adjacent receivers can be expressed in terms of the measured voltage components by using equations (2)–(6). In addition to the phase shift one also needs the relative attenuation to characterize the response of the tool. To arrive at an expression for the relative attenuation we first note that the amplitude of the voltage induced in the 1-th receiver is given by the equation $$V_{1,0} = \sqrt{V_{I,1}^2 + V_{Q,1}^2} \qquad (7)$$

The relative attenuation A is obtained from the logarithm of the ratio of the induced voltage amplitudes at the two adjacent receivers and is given by (in decibels per meter)

$$A = (8.686/L)\ln(V_{1,0}/V_{2,0}) \qquad (8)$$

where $L = z_2 - z_1$ is the distance in meters separating the centers of the two receivers. This will provide the dielectric constant and resistivity of the formation. Of course, it is possible to construct nomograms similar to those shown in FIG. 3 and obtain the dielectric constant and resistivity directly from log data.

What is claimed is:

1. A method for performing a very high frequency induction log of the formation surrounding a borehole comprising:
   inducing at a first location a very high frequency current flow in the formation, the frequency being substantially between 100–500 MHz;
   simultaneously inducing at a second location spaced from said first location a very high frequency current flow in the formation, the current flow induced at the second location being the same frequency as the current flow at said first location but of opposite direction;
   measuring both the in-phase and quadrature components of the induced voltage with respect to the induced current at third and fourth locations positioned between said first and second locations, said induced voltages being responsive to the high frequency current flow simultaneously induced in the formation at said first and second locations; and
   determining from said measured components the phase shift and relative attenuation between said induced voltages.

2. The method of claim 1 wherein the distance between the first location and the closest of said third and fourth locations is different than the distance between the second location and the closest of said third and fourth locations.

3. The method of claim 2 wherein said relative attenuation is the logarithm of the ratio of the amplitudes of the voltages.

4. The method of claim 3 wherein the voltage amplitudes are the square root of the sum of the squares of the in-phase and quadrature voltages.

5. An apparatus for very high frequency induction logging the formation surrounding a borehole comprising:
   a logging tool adapted for lowering into a borehole and having four spaced coils disposed thereon; two coils being transmitter coils and two coils being receiver coils; the receiver coils being positioned between the two transmitter coils;
   a very high frequency power supply, said power supply being coupled to said transmitter coils to induce current flows simultaneously in the formation having opposite directions, the frequency being substantially between 100–500 MHz; and
   means for detecting signals induced in said receiver coils responsive to said induced currents including both the in-phase and quadrature voltage of the induced signals and transmitting the signals to the surface to provide a determination of the phase shift and relative attenuation between the signals induced in said receiver coils.

6. A method for performing a very high frequency induction log of the formation surrounding a borehole comprising:
   inducing at a first location a substantially 300 MHZ very high frequency current flow in the formation;
   simultaneously inducing at a second location spaced from said first location a very high frequency current flow in the formation, the current flow induced at the second location being the same frequency as the current flow at said first location but of opposite direction;
   measuring both the in-phase and quadrature components of the induced voltage with respect to the induced current at third and fourth locations positioned between said first and second locations, the distance between the first location and the closest of said third and fourth locations being different than the distance between the second location and the closest of said third and fourth locations, said induced voltages being responsive to the high frequency current flow simultaneously induced in the formation at said first and second locations; and
   determining from said measured components the phase shift and relative attenuation between said induced voltages at said third and fourth locations, the relative attenuation being the logarithm of the ratio of the amplitudes of the voltages and the voltage amplitudes being the square root of the sum of the squares of the in-phase and quadrature voltages.

7. An apparatus for very high frequency induction logging the formation surrounding a borehole comprising:
   a logging tool adapted for lowering into a borehole and having four spaced coils disposed thereon; two coils being first and second transmitter coils and two coils being first and second receiver coils; the receiver coils being positioned between the two transmitter coils such that the distance between the first transmitter coil and the closest of said receiver coils is different than the distance between said second transmitter coil and the closest of said receiver coils;
   a very high frequency power supply operating at substantially 300 MHz, said power supply being coupled to said transmitter coils to induce current flows simultaneously in the formation having opposite directions; and means for detecting signals induced in said receiver coils responsive to said induced currents including both the in-phase and quadrature voltage of the induced signals and transmitting the signals to the surface to provide a determination of the phase shift and relative attenuation between the signals induced in said receiver coils.

* * * * *